(12) United States Patent
Sho et al.

(10) Patent No.: US 7,852,024 B2
(45) Date of Patent: Dec. 14, 2010

(54) VEHICLE MIRROR DEVICE

(75) Inventors: Yuji Sho, Isehara (JP); Takashi Ogawa, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 365 days.

(21) Appl. No.: 11/972,112

(22) Filed: Jan. 10, 2008

(65) Prior Publication Data
US 2008/0186603 A1   Aug. 7, 2008

(30) Foreign Application Priority Data
Feb. 6, 2007   (JP)   ............................... 2007-026849

(51) Int. Cl.
*H02P 3/00*   (2006.01)
(52) U.S. Cl. .............. 318/286; 318/400.22; 318/400.26
(58) Field of Classification Search .................. 318/286, 318/560, 465, 467, 469, 476, 838, 841, 877, 318/400.06, 400.22, 400.3, 400.26; D12/187; 362/494
See application file for complete search history.

(56) References Cited

U.S. PATENT DOCUMENTS

| 5,514,940 | A  | * | 5/1996  | Okamoto ..................... 318/469 |
| 5,801,502 | A  | * | 9/1998  | Monzen ....................... 318/286 |
| 5,952,802 | A  | * | 9/1999  | Pimley ........................ 318/468 |
| 6,917,169 | B2 | * | 7/2005  | Nagasawa et al. ............ 318/280 |
| 7,125,127 | B2 | * | 10/2006 | Luna et al. ................... 359/841 |
| 7,237,912 | B2 | * | 7/2007  | Semineth ..................... 359/604 |

FOREIGN PATENT DOCUMENTS

JP   2002-127824 A   5/2002

* cited by examiner

*Primary Examiner*—Walter Benson
*Assistant Examiner*—Antony M Paul
(74) *Attorney, Agent, or Firm*—Foley & Lardner LLP

(57) ABSTRACT

A vehicle mirror device includes a drive unit to turn a mirror unit with respect to a base unit. The drive unit includes a motor and a control circuit. The motor is driven with a battery voltage. A current supply to the motor is cut OFF when a motor current flowing in the motor exceeds a threshold, and the control circuit changes the threshold depending on the battery voltage.

2 Claims, 5 Drawing Sheets

VEHICLE MIRROR DEVICE

CROSS-REFERENCE TO RELATED APPLICATIONS

The present application claims priority to and incorporates by reference the entire contents of Japanese priority document 2007-026849 filed in Japan on Feb. 6, 2007.

BACKGROUND OF THE INVENTION

1. Field of the Invention

The present invention relates to a technology for controlling a current supply to a motor of a vehicle mirror device.

2. Description of the Related Art

A vehicle mirror device is a device that turns a mirror unit, which includes a mirror, to a predetermined position by using a drive motor. When the mirror unit has turned to a predetermined position and has stopped rotating, sometimes an overcurrent flows in the drive motor because of overloads. When an overcurrent flows in the motor, a current supply to the motor is immediately cut OFF to prevent the motor from being damaged.

For example, Japanese Patent Application Laid-open No. 2002-127824 discloses a conventional technology for controlling a vehicle mirror device (an electrically-retractable door mirror). The conventional vehicle mirror device is configured to turn a door mirror of a vehicle any position between two predetermined positions, i.e., a stretched position and a retracted position. The vehicle mirror device includes a drive motor, a switch, a time constant circuit, a first circuit, and a second circuit. The drive motor is driven to turn the door mirror to any position between the stretched position and the retracted position. The switch includes a first output terminal and a second output terminal. The switch switches over a polarity of a direct-current power supply, and is operated to supply a direct-current voltage to the drive motor. The time constant circuit is arranged between the switch and the drive motor. The first circuit is arranged between the first output terminal of the switch and one terminal of the drive motor. The second circuit is arranged between the second output terminal of the switch and the other terminal of the drive motor. Each of the first circuit and the second circuit includes an electronic switch, an overcurrent detecting unit, and a breaking switch. The electronic switch is switched ON/OFF in response to an electric signal output from the time constant circuit. The overcurrent detecting unit has a characteristic such that its resistance value increases depending on a current value flowing therein, and is series-connected to the electronic switch. The breaking switch turns OFF the electronic switch when a voltage value generated by the overcurrent detecting unit exceeds a predetermined threshold.

In the conventional vehicle mirror device, however, an electric current flowing in the drive motor is cut OFF when the current exceeds a fixed threshold. Because of this configuration, when a high battery voltage is applied to the drive motor, the current supply to the drive motor is cut OFF at the fixed threshold, although the drive motor can be further rotated.

SUMMARY OF THE INVENTION

It is an object of the present invention to at least partially solve the problems in the conventional technology.

According to an aspect of the present invention, there is provided a vehicle mirror device including a base unit that is configured to be attached to a vehicle; a mirror unit that includes a mirror and that is mounted on the base unit in a turnable manner with respect to the base unit; and a driving unit that turns the mirror unit with respect to the base unit, the driving unit including a motor that drives the mirror unit with a battery voltage; and a control circuit that cuts OFF a current supply to the motor when an electric current flowing in the motor exceeds a threshold, and the control circuit changes the threshold depending on the battery voltage.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
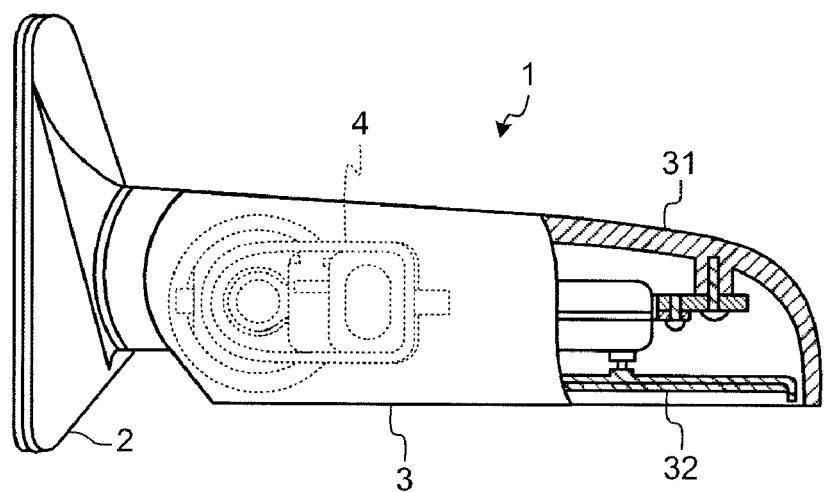
FIG. 1 is a schematic diagram of a vehicle mirror device according to an embodiment of the present invention.
Figure 2:
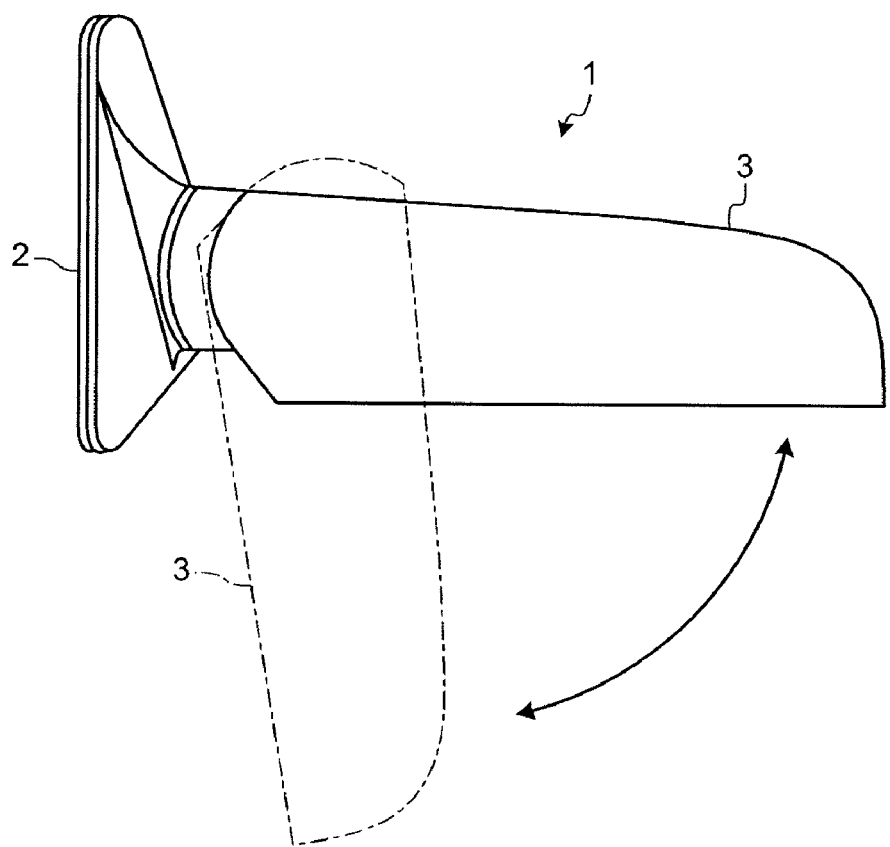
FIG. 2 is a schematic diagram for explaining operation of stretching and retracting the vehicle mirror device.
Figure 3:
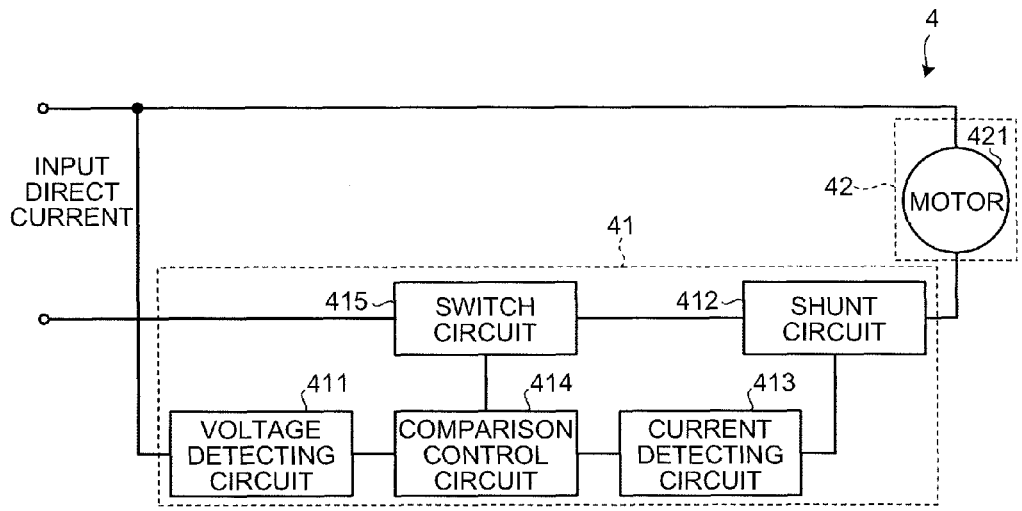
FIG. 3 is a block diagram of a driving unit shown in FIG. 1.

FIG. 1 is a schematic diagram of a vehicle mirror device 1 according to an embodiment of the present invention. FIG. 2 is a schematic diagram for explaining operation of stretching and retracting the vehicle mirror device 1. FIG. 3 is a block diagram of a driving unit 4 shown in FIG. 1. The vehicle mirror device 1 can be attached to a vehicle (not shown) as an electrically-retractable door mirror (outside mirror).

The vehicle mirror device 1 includes a base unit 2, a mirror unit 3, and the driving unit 4. The base unit 2 is configured to be attached to a door (not shown) of the vehicle. The mirror unit 3 includes a mirror housing 31 and a mirror 32 that is housed inside the mirror housing 31. The mirror unit 3 is mounted on the base unit 2 in a turnable manner with respect to the base unit 2, as shown in FIG. 2. The driving unit 4 is configured to turn the mirror unit 3 with respect to the base unit 2, and it is also housed inside the mirror housing 31.

As shown in FIG. 3, the driving unit 4 includes a control circuit 41 and a driving mechanism 42. The control circuit 41 is configured to control the driving mechanism 42, and it is connected to a vehicle battery (not shown) that is a direct-current power supply. The control circuit 41 will be described in detail later.

The driving mechanism 42 includes a motor 421 and a plurality of gears (not shown) that is connected to the motor 421. The motor 421 is driven with a battery voltage applied from a vehicle battery. A torque of the motor 421 is transmitted to the mirror unit 3 through the gears, so that the mirror unit 3 is turned with respect to the base unit 2.

As shown in FIG. 2, the mirror unit 3 can be turned to any position between a predetermined stretched position and a predetermined retracted position including both of those positions. When the mirror unit 3 is at the stretched position, the driver of the vehicle can see the mirror 32 from inside the vehicle. To turn the mirror unit 3 from the stretched position to the retracted position, the driving unit 4 is driven by operating a switch (not shown) arranged in a vehicle. To return the mirror unit 3 from the retracted position to the stretched position, the driving unit 4 is driven by operating the switch.

As shown in FIG. 3, the control circuit 41 includes a voltage detecting circuit 411, a shunt circuit 412, a current detecting circuit 413, a comparison control circuit 414, and a switch circuit 415. The voltage detecting circuit 411 detects a battery voltage applied from a battery (a voltage to be applied to the motor 421). The shunt circuit 412 converts a motor current (an electric current flowing in the motor 421) into a voltage. The current detecting circuit 413 detects the motor current via the shunt circuit 412. The comparison control circuit 414 compares the battery voltage detected by the voltage detecting circuit 411 with the motor current detected by the current detecting circuit 413, and generates an output signal indicative of the result of the comparison. The switch circuit 415 turns ON/OFF a current supply to the motor 421 based on the output signal.

Figure 4:
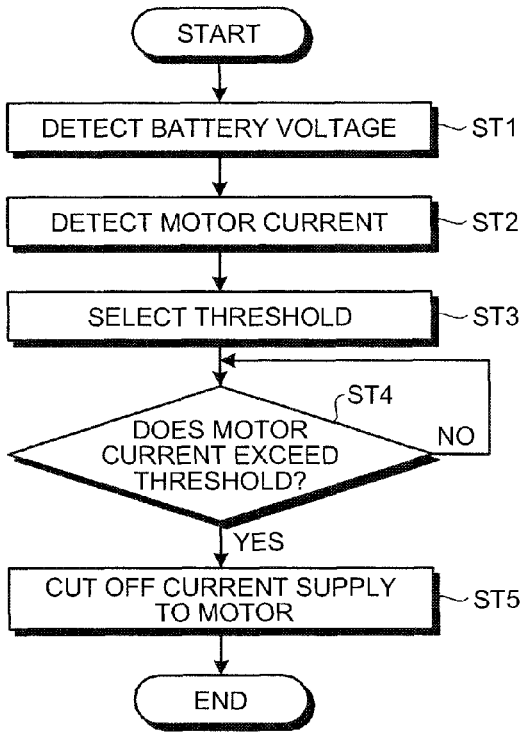
FIG. 4 is a flowchart of operation performed by a control circuit shown in FIG. 3.

FIG. 4 is a flowchart of operation performed by the control circuit 41. To set the mirror unit 3 to the retracted position (or the stretched position), the switch circuit 415 is driven to turn ON the current supply to the motor 421, so that the battery voltage is applied to the motor 421. The voltage detecting circuit 411 detects the battery voltage (step ST1), and the comparison control circuit 414 receives the battery voltage detected by the voltage detecting circuit 411. Meanwhile, when the motor 421 is locked due to overloads, an overcurrent flows in the motor 421. The current detecting circuit 413 detects the overcurrent, and determines that as a motor current (step ST2). The comparison control circuit 414 receives the motor current detected by the current detecting circuit 413.

Figure 5:
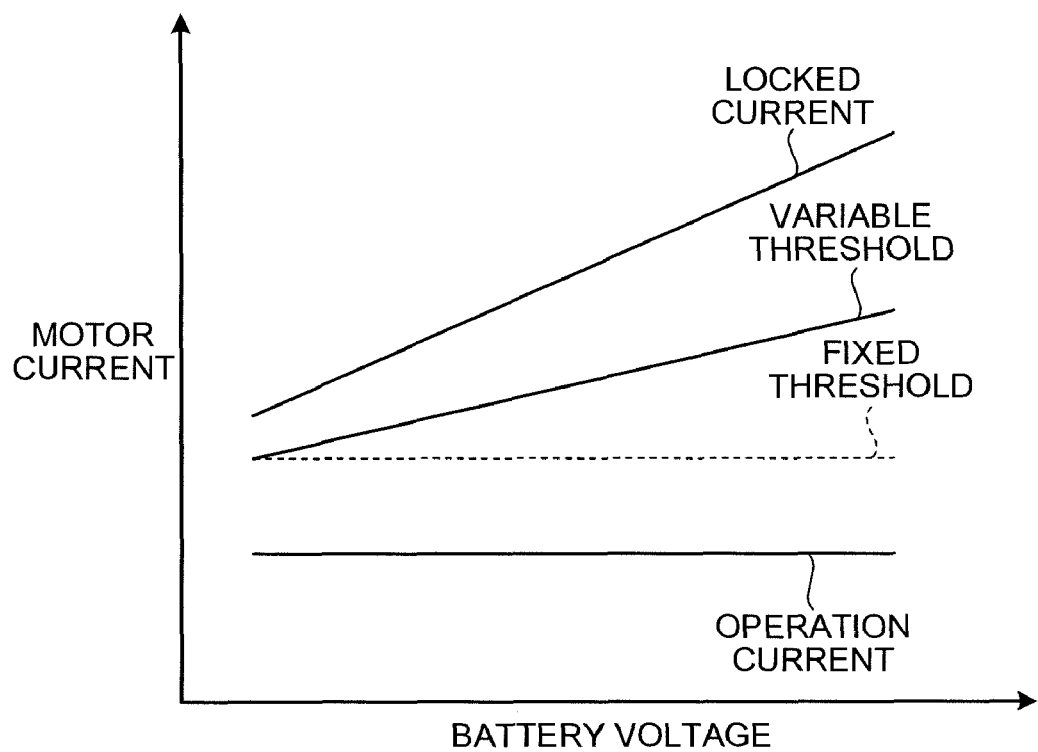
FIG. 5 is a graph for explaining relation between a battery voltage and a threshold.

FIG. 5 is a graph for explaining relation between a battery voltage and a threshold. An increase of a battery voltage causes an increase of a motor current (locked current) flowing in the motor 421 that is locked due to overloads. When a high battery voltage is applied to the motor 421, the motor 421 generates a higher torque, i.e., the motor 421 can be rotated with a higher motor current than that of when a low battery voltage is applied to the motor 421.

In the vehicle mirror device 1, the current supply to the motor 421 is cut OFF when the motor current exceeds a threshold, and the comparison control circuit 414 changes the threshold depending on the battery voltage. As shown in FIG. 5, the threshold is increased in proportion to the battery voltage. In other words, a difference between an electric current flowing in the motor 421 during normal operation and the threshold increases in proportion to the battery voltage. In this manner, as shown in FIG. 4, the comparison control circuit 414 selects a threshold corresponding to a battery voltage (step ST3).

The comparison control circuit 414 then compares a motor current with the selected threshold (step ST4). When the motor current exceeds the threshold, the comparison control circuit 414 outputs an output signal that causes the switch circuit 415 to be driven to cut OFF the current supply to the motor 421 (step ST5). Thus, the motor 421 can be prevented from being damaged by the overcurrent.

As described above, the current supply to the motor 421 is cut OFF based on a threshold that is determined depending on a battery voltage. As a result, when a high battery voltage is applied to the motor 421 and the motor 421 is driven with a higher torque, the current supply to the motor 421 is cut OFF by a threshold corresponding to that battery voltage. Thus, it is possible to achieve improved torque performance of the motor 421, and improve performance of the motor 421 in response to overloads or load changes.

Figure 6:
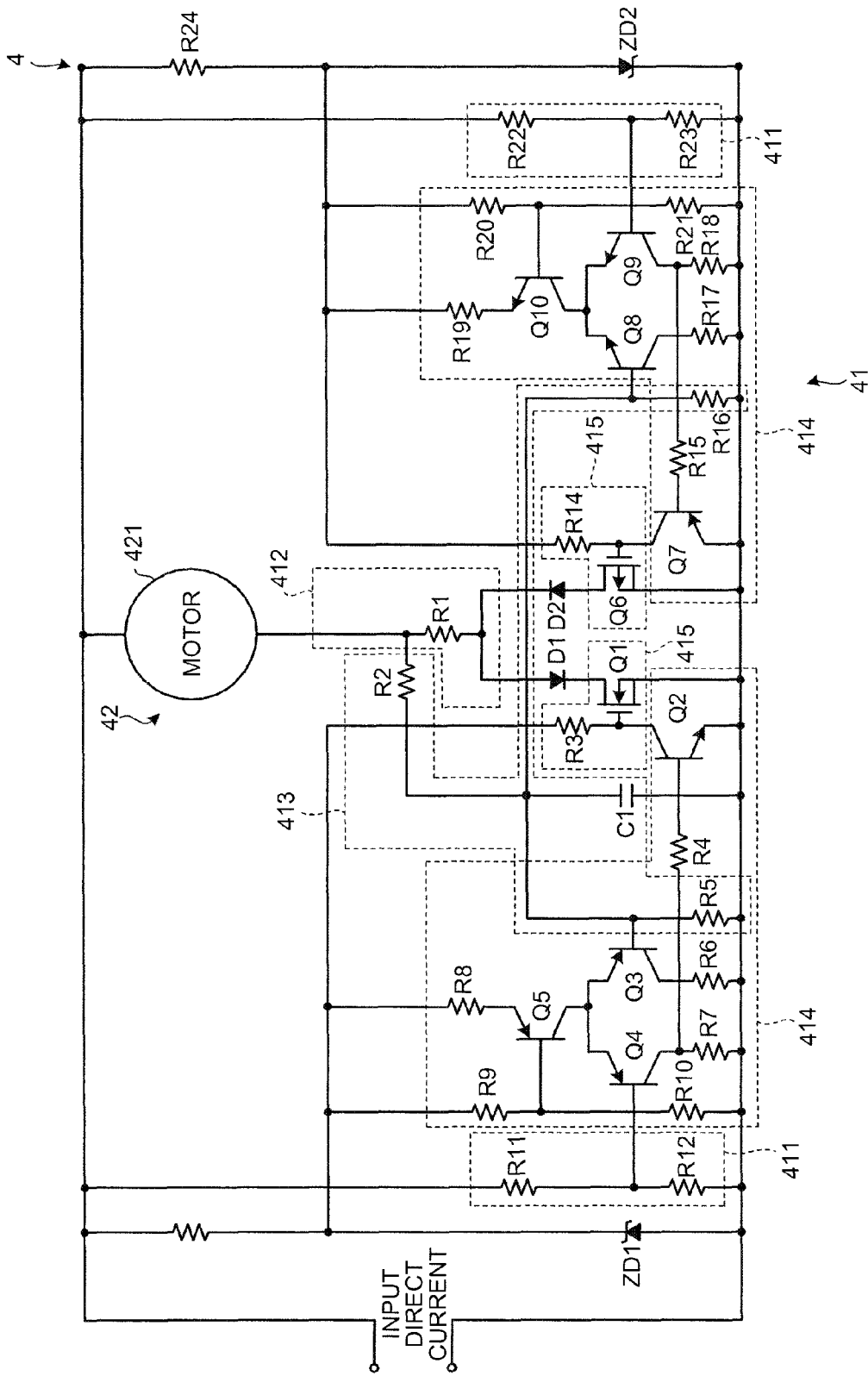
FIG. 6 is an example of the circuitry of the control circuit.

FIG. 6 is an example of a circuitry of the control circuit 41. The control circuit 41 is configured as described below. The control circuit 41 includes two circuits, i.e., a retracting circuit adapted to set the mirror unit 3 to the retracted position and a stretching circuit adapted to set the mirror unit 3 to the stretched position. The retracting circuit and the stretching circuit are arranged symmetrically to each other. Operations of retracting and stretching the mirror unit 3 are selectively performed by switching over a connection of a vehicle battery to the retracting circuit or the stretching circuit.

The retracting circuit (the stretching circuit) is configured as described below. It should be noted that a configuration of the stretching circuit is explained in parentheses as appropriate in the following description. The voltage detecting circuit 411 includes a resistor R11 and a resistor R12 (a resistor R22 and a resistor R23). The shunt circuit 412 includes a resistor R1. The current detecting circuit 413 includes a resistor R2, a resistor R5, and a capacitor C1 (the resistor R2, a resistor R16, and the capacitor C1) that are configured as a charge circuit. The comparison control circuit 414 includes resistors R4 to RIO and transistors Q2 to Q5 (resistors R15 to R21 and transistors Q7 to Q10). The switch circuit 415 includes a resistor R3 and a switching element Q1 (a resistor R14 and a switching element Q6). The reference marks D1, D2 denote a diode, R24 a resistor, and ZD1, ZD2 a Zener diode.

When the motor 421 is in a normal operation state, a battery voltage is divided by the resistors R11 and R12 (the resistors R22 and R23), and is applied to a base of the transistor Q4 (the transistor Q9). On the other hand, a current flowing in the motor 421 is detected by the resistor R1, and is applied to a base of the transistor Q3 (the transistor Q8) through the resistor R2, the resistor R5, and the capacitor C1 (the resistor R2, the resistor R16, and the capacitor C1). The transistors Q3 to Q5 (the transistors Q8 to Q10) are configured as a differential amplifier circuit. When an electric potential applied to the base of the transistor Q3 (the transistor Q8) is lower (higher) than that to a base of the transistor Q4 (the transistor Q9), the transistor Q3 (the transistor Q8) is turned ON. Accordingly, the transistor Q4 (the transistor Q9) is turned OFF, and an electric potential applied to a collector of the transistor Q4 (the transistor Q9) becomes zero. Meanwhile, the transistor Q2 (the transistor Q7) is turned OFF, and the switching element Q1 (the switching element Q6) is turned ON.

When the motor current increases, an electric potential applied to the base of the transistor Q3 (the transistor Q8) becomes higher (lower) than that to the base of the transistor Q4 (the transistor Q9). The transistor Q3 (the transistor Q8) is then turned OFF, and the transistor Q4 (the transistor Q9) is turned ON. Thus, the transistor Q3 (the transistor Q8) and the transistor Q4 (the transistor Q9) are operated in a reverse manner. Accordingly, the transistor Q2 (the transistor Q7) is turned ON. The switching element Q1 (the switching element Q6) is then turned OFF, thereby cutting OFF the current supply to the motor 421.

Specifically, the comparison control circuit 414 includes a comparison circuit and a drive circuit. The comparison circuit includes the resistors R6 to R10 and the transistors Q3 to Q5 (the resistors R17 to R21 and the transistors Q8 to Q10). The comparison circuit is configured to compare the battery voltage with the motor current. The drive circuit includes the resistors R3, R4 and the transistor Q2 (the resistors R14, R15 and the transistor Q7). The drive circuit is configured to drive the switch circuit 415 based on a result of a comparison performed by the comparison circuit. The base of the transistor Q4 (the transistor Q9) (a first transistor) is connected to the voltage detecting circuit 411. The battery voltage is divided by the resistors R11, R12 (the resistors R22, R23), so that an electric potential is applied to the base of the transistor Q4 (the transistor Q9). When the battery voltage increases, an electric potential applied to the base of the transistor Q4 (the transistor Q9) becomes higher (lower). On the other hand, the base of the transistor Q3 (the transistor Q8) (a second transistor) is connected to the current detecting circuit 413. When the motor current increases, an electric potential applied to the base of the transistor Q3 (the transistor Q8) becomes higher (lower). By comparing the electric potentials applied to the bases of the transistors Q3 and Q4 (the transistors Q8 and Q9), either one of the transistors Q3 and Q4 (the transistors Q8 and Q9) having a lower (higher) electric potential is turned ON. In this manner, a threshold is caused to increase in proportion with a battery voltage.

Figure 7:
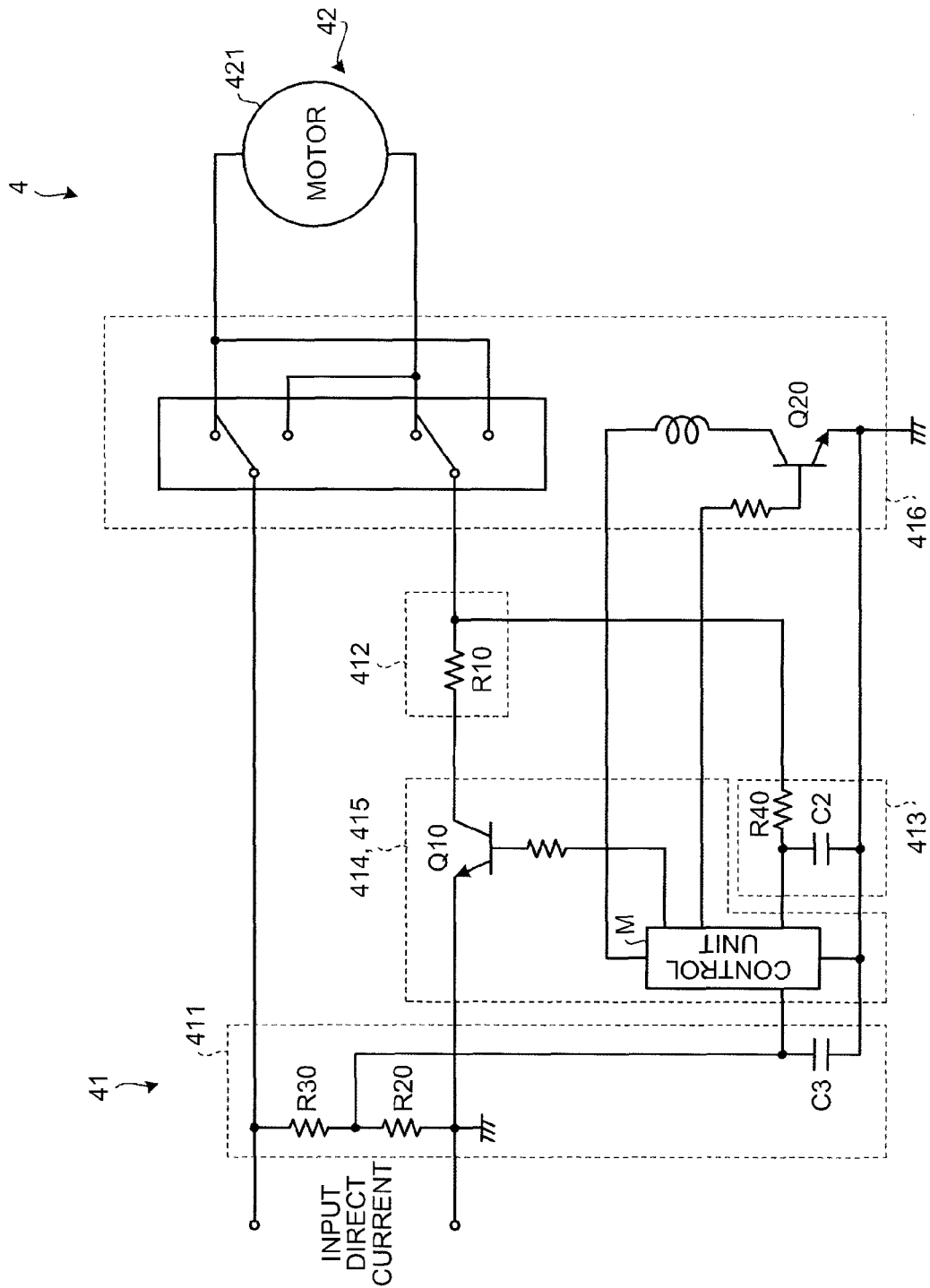
FIG. 7 is another example of the circuitry of the control circuit.

FIG. 7 is another example of a circuitry of the control circuit 41. The control circuit 41 is configured as described below. The voltage detecting circuit 411 includes a resistor R20, a resistor R30, and a capacitor C3. The shunt circuit 412 includes a resistor R10. The current detecting circuit 413 includes a resistor R40 and a capacitor C2. The comparison control circuit 414 and the switch circuit 415 are configured as one circuit, and the circuit includes a control unit (microcomputer) M and a transistor Q10. A polarity inverting circuit 416 includes a transistor Q20. The polarity inverting circuit 416 switches a current supply to the motor 421 when switching over operations of retracting and stretching the mirror unit 3.

The battery voltage is divided by the resistor R20 and the resistor R30, and is applied to an analog-to-digital input channel of the control unit M. The battery voltage is applied to the control unit M at a voltage division ratio depending on fluctuations of the battery voltage. The control unit M prepares thresholds corresponding to various battery voltages in advance. A motor current is converted into a voltage by a resistor R10, and applied to the control unit M. When a battery voltage fluctuates, the control unit M selects a threshold corresponding to that battery voltage. The motor current is then compared with the selected threshold. When the motor current exceeds the threshold, the current supply to the motor 421 is cut OFF. The polarity inverting circuit 416 switches a connection between the control circuit 41 and the motor 421, so that operations of retracting and stretching the mirror unit 3 are switched over.

According to an aspect of the present invention, a current supply to a motor is cut OFF based on a threshold that is determined depending on a battery voltage. As a result, when a high battery voltage is applied to the motor, the current supply to the motor is cut OFF by a threshold corresponding to that battery voltage. Thus, it is possible to achieve improved torque performance of the motor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle mirror device comprising:
a base unit that is configured to be attached to a vehicle;
a mirror unit that includes a mirror and that is mounted on the base unit in a turnable manner with respect to the base unit; and
a driving unit that turns the mirror unit with respect to the base unit, the driving unit including
a motor that drives the mirror unit with a battery voltage; and
a control circuit that cuts OFF a current supply to the motor when an electric current flowing in the motor exceeds a threshold, and the control circuit changes the threshold depending on the battery voltage,
wherein the control circuit includes
a voltage detecting circuit that detects the battery voltage;
a current detecting circuit that detects the electric current flowing in the motor; and
a comparison control circuit that compares the electric current detected by the current detecting circuit with the battery voltage detected by the voltage detecting circuit, and cuts OFF a current supply to the motor based on a result of comparison between the electric current and the battery voltage; and
wherein the comparison control circuit includes
a first transistor having a base connected to the voltage detecting circuit; and
a second transistor having a base connected to the current detecting circuit, wherein
the second transistor is turned ON when the electric current flowing in the motor does not exceed the threshold, and
the first transistor is turned ON when the electric current flowing in the motor exceeds the threshold.

2. A vehicle mirror device comprising:
a base unit that is configured to be attached to a vehicle;
a mirror unit that includes a mirror and that is mounted on the base unit in a turnable manner with respect to the base unit; and
a driving unit that turns the mirror unit with respect to the base unit, the driving unit including
a motor that drives the mirror unit with a battery voltage; and
a control circuit that cuts OFF a current supply to the motor when an electric current flowing in the motor exceeds a threshold, and the control circuit changes the threshold depending on the battery voltage,
wherein the control circuit includes
a voltage detecting circuit that detects the battery voltage;
a current detecting circuit that detects the electric current flowing in the motor; and
a comparison control circuit that compares the electric current detected by the current detecting circuit with the battery voltage detected by the voltage detecting circuit, and cuts OFF a current supply to the motor based on a result of comparison between the electric current and the battery voltage, and
wherein the comparison control circuit includes
a transistor that compares the electric current detected by the current detecting circuit with the battery voltage detected by the voltage detecting circuit; and
a control unit that changes the threshold depending on the battery voltage.

* * * * *